United States Patent [19]

Szablikowski et al.

[11] Patent Number: 5,484,903
[45] Date of Patent: Jan. 16, 1996

[54] PROCESS FOR THE PRODUCTION OF POLYSACCHARIDE CARBONATES

[75] Inventors: Klaus Szablikowski, Walsrode; Hans-Josef Buysch; Alexander Klausener, both of Krefeld, all of Germany

[73] Assignee: Wolff Walsrode Aktiengesellschaft, Walsrode, Germany

[21] Appl. No.: 941,495

[22] Filed: Sep. 8, 1992

[30] Foreign Application Priority Data

Sep. 17, 1991 [DE] Germany ............ 41 30 807.7

[51] Int. Cl.⁶ .................. C07H 1/00; C07H 13/02; C08B 31/00; C08B 37/00
[52] U.S. Cl. ............ 536/18.6; 536/119; 536/123.12; 536/124; 536/56; 536/102; 536/103
[58] Field of Search .................. 536/119, 124, 536/56, 102, 103, 123.12, 18.6

[56] References Cited

U.S. PATENT DOCUMENTS

| | | | |
|---|---|---|---|
| 3,284,442 | 11/1966 | Jarowenko et al. | 536/47 |
| 3,378,542 | 4/1968 | O'Boyle | 536/119 |
| 3,699,095 | 10/1972 | Tessler et al. | 536/106 |
| 4,005,121 | 1/1977 | Senet | 558/266 |
| 4,013,702 | 3/1977 | Cartier | 558/266 |
| 5,068,321 | 11/1991 | Buysch et al. | 536/107 |

FOREIGN PATENT DOCUMENTS 0367002  5/1990  European Pat. Off. .

Primary Examiner—William H. Beisner
Assistant Examiner—Everett White
Attorney, Agent, or Firm—William C. Gerstenzang; Sprung Horn Kramer & Woods

[57] ABSTRACT

The invention relates to a process for the production of carbonic acid esters of polysaccharides which is characterized in that polysaccharides are reacted with carbonic acid esters.

3 Claims, No Drawings

PROCESS FOR THE PRODUCTION OF POLYSACCHARIDE CARBONATES

This invention relates to a process for the production of carbonic acid esters of polysaccharides which is characterized in that polysaccharides are reacted with carbonic acid esters.

Carbonic acid esters of polysaccharides are interesting materials having a range of potential applications, for example as "stores" for bioactive compounds (cf. Makromol. Chem. 186, 17–29 (1985), for fixing enzymes for carrying out enzymatic reactions in heterogeneous phase (cf. I. C. S. Perkin I 1974, 757–762 or Biochemistry Internat. 4 (1982, 629–635) or U.S. Pat. No. 3,810,821) and as starting products for paint raw materials, as thickeners for aqueous solutions and suspensions, for example in the building industry or for adhesive raw materials (cf. U.S. Pat. No. 3,284,442 and U.S. Pat. No. 4,097,667).

For these reasons, there has been no shortage of attempts to make these compounds available in various ways.

Accordingly, there is no simple and efficient process for the production of carbonic acid esters and polysaccharides which can be carried out with a very high reagent yield and without waste products and which leads to high degrees of substitution.

It has now been found that carbonic acid esters of polysaccharides can be obtained in a simple and elegant manner by transesterification of polysaccharides with carbonic acid esters.

Accordingly, the present invention relates to a process for the production of carbonates of polysaccharides which is characterized in that polysaccharides are transesterified with carbonic acid esters corresponding to general formula I $$R^1-O-\overset{O}{\underset{\|}{C}}-O-R^2 \qquad I$$

in which $R^1$ and $R^2$ may be the same or different and represent $C_{1-12}$ alkyl, preferably $C_{1-8}$ alkyl and, more preferably, $C_{1-4}$ alkyl, allyl and methallyl, benzyl, phenyl, cresyl, or $R^1$ and $R^2$ together with the carbonate group form a ring containing a total of 5 to 12 ring members in which $R^1$ and $R^2$ are:

| | |
|---|---|
| $-(CH_2)_n-$ | with $n = 2–10$, preferably 2–6 and, more preferably, 2 and 3 |
| $-CH_2-CH-$<br>$\quad\quad\;\;\;\|$<br>$\quad\quad\;\;\;R^3$ | with $R^3 = CH_3, C_2H_5$, phenyl, $CH_2-Cl$, preferably $CH_3$ |
| $-CH_2-C-CH_2-$<br>$\quad\;\;\;/\;\;\;\backslash$<br>$\quad\;R^4\quad R^5$ | with $R^4$ and $R^5$ same or different 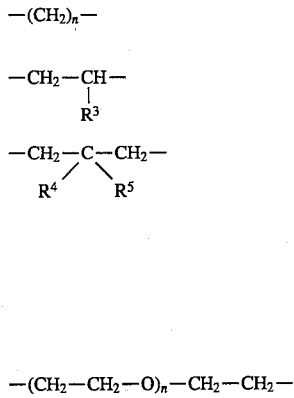<br>$-CH_3, -C_2H_5, -CH_2OH, -CH_2-O-CH_2-$phenyl<br>$-CH_2-O-CH_2-CH=CH_2$<br>preferably $CH_3, CH_2OH, CH_2O-CH_2CH=CH_2$<br>more preferably $CH_3$ |
| $-(CH_2-CH_2-O)_n-CH_2-CH_2-$ | with $n = 1–3$, preferably 1–2, |

All hitherto known processes introduce the carbonate group via particularly reactive carbonic acid derivatives, generally chlorocarbonic acid esters. This also appears practical because the well-known low reactivity of polysaccharides, as reflected in normally long reaction times, is said to be compensated by the use of reactive reagents (cf. U.S. Pat. Nos. 3,284,442, 3,810,821, 4,097,667; Carbohydrate Research 17 (1971) and the literature cited above). These reactions are often carried out in the presence of hydroxyl compounds, such as water or alcohols, or in the presence of expensive solvents. A large part of the chlorocarbonic acid ester is consumed in secondary reactions with water or alcohol. The expensive solvents are difficult to recover from the complicated reaction mixtures. The hydrogen chloride released during the reaction has to be trapped by bases and the organic nitrogen base normally used has to be released from its salts and reused. Accordingly, these processes involve considerable effort. In addition, only a low degree of substitution (DS) is obtained and is often inadequate for the applications mentioned.

An exception in this regard is DE-OS 3 836 600 by which very high DS values can be obtained. However, this process also involves the use of chlorocarbonic acid esters.

at temperatures in the range from 40° to 160° C., optionally in the presence of catalysts.

This is surprising because, in view of the long reaction times with the highly reactive chlorocarbonic acid esters, it had been expected that the much more sluggishly reacting carbonic acid esters would only lead to significant conversions in—industrially—totally unacceptable times.

By contrast, high degrees of transesterification are obtained in relatively short reaction times. The process according to the invention affords particular advantages in the fact that it is completely free from waste products. In the transesterification reaction with the polysaccharides, the carbonic acid esters of formula I only give the hydroxy compounds on which the esters are based as secondary products. These hydroxy compounds can be removed by distillation and reused for the production of the carbonic acid esters corresponding to formula I.

According to U.S. Pat. No. 3,810,821, cyclic carbonates are formed in large quantities, often in predominant quantities, in addition to the open carbonates in reactions of polysaccharides with chlorocarbonic acid esters. This is a disadvantage insofar as two OH groups are bound by ring formation, thus reducing the substitution sites on the polysaccharide. When a polysaccharide carbonate containing such rings is subsequently reacted with amino groups, for example of an enzyme to be bound, a cyclic carbonate is always ring-opened with reformation of one OH group and formation of only one urethane group, i.e. theoretically only up to 50% urethane can be formed from a cyclic carbonate whereas up to 100% urethane can be formed from an open carbonate group. Accordingly, the substitution possibilities are much more favorable in the case of open carbonates.

The carbonates obtainable by the process according to the invention contain hardly any cyclic carbonates and are therefore more uniformly substituted than those hitherto obtainable and can be used with greater advantage for further reactions.

Starting materials:

Suitable starting materials for the production of the polysaccharide carbonates according to the invention are, for example, polyglucosans, such as cellulose; the various derivatives of cellulose, such as, methyl cellulose; or mixed cellulose ethers, such as methyl hydroxyethyl cellulose, carboxymethyl cellulose, various salts thereof with sodium, potassium, calcium or ammonium ions, particularly quaternary ammonium ions; cellulose sulfate with various counterions, for example of sodium, potassium, calcium, ammonium and quaternary ammonium groups; starch, dextrins, glycogen; polyfructosans, such as inulin and graminin; polymannosans, polygalactosans; also mixed polysaccharides, such as hemicelluloses, polyxylosans and polyarabinosans and also heteropolysaccharides, such as gellan, xanthan and pullulan.

Preferred starting products are cellulose and derivatives thereof, starch and dextrins, particular preference being attributed to cellulose, methyl cellulose, ethyl cellulose, hydroxyethyl cellulose, hydroxypropyl cellulose, carboxymethyl cellulose and salts thereof and starch.

Suitable carbonic acid esters are those corresponding to formula I in which $R^1$ and $R^2$ may be the same or different and represent $CC_{1-12}$ alkyl, preferably $CC_{1-8}$ alkyl and, more preferably, $CC_{1-4}$ alkyl, allyl and methallyl, benzyl, phenyl, cresyl, or $R^1$ and $R^2$ together with the carbonate group form a ring containing a total of 5 to 12 ring members in which $R^1$ and $R^2$ are:

such as methyl ethyl, methyl isopropyl, methyl cyclohexyl or ethyl butyl carbonate, but preferably symmetrical carbonates. Of these, dimethyl, diethyl, dipropyl and dibutyl carbonate are particularly preferred, dimethyl and diethyl carbonate being most particularly preferred. Other suitable carbonic acid esters are benzyl carbonates, such as methyl benzyl carbonate, ethyl benzyl carbonate and dibenzyl carbonate, diallyl and dimethyl allyl carbonate, diphenyl carbonate, di-p-cresyl carbonate, di-o-cresyl carbonate, ethylene and propylene carbonate, trimethylene carbonate, 4-phenyl dioxolanone, 4-ethyl dioxolanone

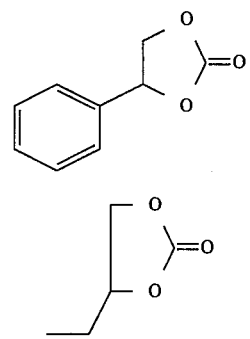

5,5-dimethyl-1,3-dioxan-2-one, 5-ethyl-5-hydroxymethyl-1,3-dioxan-2-one, 5-ethyl-5-allyloxy-1,3-dioxan-2-one

| | |
|---|---|
| $-(CH_2)_n-$ | with n = 2–10, preferably 2–6 and, more preferably, 2 and 3 |
| $-CH_2-\underset{R^3}{CH}-$ | with $R^3$ = $CH_3$, $C_2H_5$, phenyl, $CH_2-Cl$, preferably $CH_3$ |
| $-CH_2-\underset{R^4\ \ R^5}{C}-CH_2-$ | with $R^4$ and $R^5$ same or different<br><br>$-CH_3$, $-C_2H_5$, $-CH_2OH$, $-CH_2-O-CH_2-$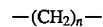<br><br>$-CH_2-O-CH_2-CH=CH_2$<br>preferably $CH_3$, $CH_2OH$, $CH_2O-CH_2CH=CH_2$<br>more preferably $CH_3$ |
| $-(CH_2-CH_2-O)_n-CH_2-CH_2-$ | with n = 1–3, preferably 1–2. |

Examples of such carbonic acid esters are dialkyl carbonates, such as dimethyl, diethyl, dipropyl, diisopropyl, dibutyl, diisobutyl, dicyclohexyl, dioctyl, didodecyl, diisooctyl and diisononyl carbonate; asymmetrical representatives,

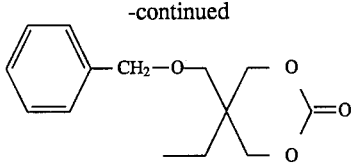

5-ethyl-5-benzyloxy-1,3-dioxan-2-one and, finally, cyclic carbonates of polyglycols, such as diglycol, triglycol and tetraglycol.

Preferred carbonates are the simple dialkyl carbonates mentioned above, diphenyl carbonate, ethylene carbonate, 1,2-propylene carbonate, 1,3-propylene carbonate, 2,2-dimethyl-1,3-propylene carbonate, 2-ethyl-2-hydroxymethyl-1,3-propylene carbonate, 2-ethyl-2-allyloxy-1,3-propylene carbonate.

In principle, the reaction may be carried out without a catalyst. In general, however, it is of advantage to use a catalyst because this shortens the transesterification time. Suitable catalysts are compounds of the alkali and alkaline earth metals, zinc, cobalt, titanium, zirconium, thallium, lead and tin and also organic bases, such as nitrogen bases and quaternization products thereof.

Suitable compounds of these metals are the hydrides, hydroxides, oxides, carbonates, alcoholates, such as methylates, ethylates, isopropylates, butylates, dodecylates, sulfates, nitrates; carboxylates, such as acetates, propionates, benzoates or stearates, halides, thiocyanates, cyanides and, in the case of tin, also alkyl, dialkyl and trialkyl or phenyl tin chlorides, carboxylates, alcoholates, oxides or hydroxides. Preferred metal compounds are compounds of the alkali metals, zinc, tin and titanium in the form of the hydroxides, oxides, carbonates, alcoholates, carboxylates and, in the case of tin, in the form of the mono-, di- and trialkyl tin oxides, hydroxides, carboxylates and alcoholates.

Suitable bases for the production of the polysaccharide carbonates according to the invention are tertiary nitrogen bases from the aliphatic, aromatic and heterocyclic series, such as trimethyl amine, triethyl amine, tributyl amine, dimethyl cyclohexyl amine, diisopropyl ethyl amine, dicyclohexyl methyl amine, dimethyl-$\beta$-methoxyethyl amine, N,N,N',N'-tetramethyl ethylenediamine, N,N,N',N'-tetramethyl-$\beta,\beta'$-diaminodiethyl ether, N,N'-dimethyl piperazine, N-methyl morpholine and diazabicyclooctane, N,N'-dimethyl aniline, N,N-diethyl aniline, N,N,N',N'-tetramethyl diaminobenzene, N,N-dimethyl toluidine, N,N-diethyl xylidine, N,N-dimethyl anisidine and N-phenyl morpholine, pyrazole, N-alkyl pyrazole, imidazole, N-methyl imidazole, triazole, N-ethyl triazole, N,N-dimethylaminoimidazole, N,N-diethylaminotriazole, pyridine, $\alpha,\beta$-picoline, the lutidines, collidine, ethyl methyl pyridines, N,N-dialkylaminopyridines, such as N,N-dimethyl-4-aminopyridine, quinoline, methyl quinoline and isoquinoline.

Preferred bases are diazabicycloundecene, diazabicyclononene, triethyl amine, dimethyl cyclohexyl amine, methyl morpholine, dimethyl piperazine and diazabicyclooctane, tetramethyl ethylenediamine, triazole, aminotriazole, diethylamino triazole, imidazole, N-methyl imidazole, N,N-dimethylaminoimidazole, pyridine, quinoline and the methyl and ethyl pyridines.

The process is best carried out at elevated temperature, for example at a temperature in the range from 40° to 160° C., preferably at a temperature in the range from 60° to 150° C. and, more preferably, at a temperature in the range from 70° to 140° C.

The process may be carried out under various pressures in the range from 0.1 mbar to 10 bar, preferably in the range from 1 mbar to 5 bar and, more preferably, in the range from 2 mbar to 3 bar. In general, the transesterification reaction may be carried out under atmospheric pressure. If any hydroxy compounds formed are to be removed during the transesterification reaction, reduced pressure may have to be applied; where the transesterification is carried out with low-boiling dialkyl carbonates at relatively high temperatures, elevated pressure may be advisable.

In many cases, the reaction may be carried out in the particular carbonic acid esters used as the reaction medium. However, if only a little carbonic acid ester is to be used or if the carbonic acid ester has a relatively high melting point, it is advisable to use a solvent as diluent and suspending agent or solvent for the polysaccharide.

Suitable solvents or suspending agents are, for example, cyclohexane, pentane, heptane, isooctane, benzene, toluene, methylene chloride, chloroform, dichloroethane, trichloroethylene, chlorobenzene, dichlorobenzene, bromobenzene, diethyl ether, diisopropyl ether, dibutyl ether, dioxane, benzodioxane, anisole, dimethoxybenzene, ethylene glycol dimethyl ether, diethylene glycol dimethyl ether, ethyl acetate, butyl acetate, ethyl propionate, ethyl butyrate, ethyl benzoate, diethyl malonate, diethyl succinate, acetone, methyl ethyl ketone, diethyl ketone, methyl isopropyl ketone, acetophenone, cyclohexanone, formamide, methyl formamide, dimethyl formamide, dimethyl acetamide, tetramethyl urea, N,N-dimethyl ethylene urea, N,N-dimethyl-2,6-diaza-4-oxacyclohexanone, N-methyl pyrrolidone, N-methyl caprolactam, acetonitrile, $\beta$-methoxypropionitrile and $\beta$-cyano-$\beta'$-methoxydiethyl ether.

Basically, the polysaccharide may be reacted in dissolved form. This generally involves large reaction volumes. Accordingly, the reaction is preferably carried out in suspension or dispersion. As described above, the particular carbonic acid esters to be used or the solvents mentioned above may be used as dispersants.

The molar ratio of carbonic acid ester to polysaccharide is not critical and may vary between 100:1 and 1:20, preferably between 80:1 and 1:15 and, more preferably, between 60:1 and 1:10.

The degree of substitution of the polysaccharide may be influenced under otherwise the same conditions by the quantity of carbonic acid ester used or its dilution by solvents or dispersants, by the reaction time and the type and quantity of catalyst used, the degree of substitution being higher, the larger the quantity of carbonic acid ester or catalyst used, the more active the catalyst and the longer the reaction time which may vary between 0.5 and 40 h, preferably between 1 and 30 h and, more preferably, between 1 and 25 h.

To carry out the transesterification, the polysaccharide and the carbonic acid ester (and optionally a dispersant)—in such a quantity that a readily stirrable dispersion is formed—are heated with stirring to the reaction temperature together with the catalyst, if any. Depending on its boiling point and the conditions established, the hydroxy compound formed may be removed from the reaction mixture by distillation or may even remain in the reaction mixture. The progress of the reaction can be followed by IR-spectroscopic analysis of polysaccharide samples, by determination of their $CO_2$ content, by saponification or by gas-chromatographic determination of the hydroxy compounds formed.

On completion of the transesterification, the polysaccharide carbonate is filtered off under suction, optionally washed and dried.

The filtrate may be worked up by distillation, excess carbonic acid ester may be returned to the transesterification reaction and the hydroxy compound may be reused in the synthesis of the carbonic acid esters.

In certain cases, for example where celluloses of different origin are used, the polysaccharide should be pretreated to digest it for the transesterification reaction. Digestion may be carried out in known manner by the action of sodium hydroxide solutions, ammonia, amines and quaternary ammonium compounds (cf..Ullmanns Encyclopedia, 4th Edition, Vol. 5a, pp. 383 et seq.). The digesting agents may be displaced by solvents and the solvents may be displaced by the carbonic acid esters. However, parts of the digesting agent may also remain as catalysts in the polysaccharide. The inclusion celluloses (cf. Ullmann's l. c.) formed by displacement of the digesting agent with solvent may also be used for the transesterification.

The invention is illustrated by the following Examples.

Example 1

137 g of a commercially available spruce cellulose were stirred for a few hours at 25° C. with approx. 2 l of a water/isopropanol solution containing 76 g NaOH, filtered under suction and washed free from alkali with methanol, filtered under suction and the methanol is displaced with dimethyl carbonate.

100 g of the moist cellulose were boiled under reflux for 3 h with approx. 1 l dimethyl carbonate and 1 g sodium hydroxide. Filtration under suction, repeated thorough washing with methanol and drying in vacuo at 50° C. leaves 75 g methyl carbonate cellulose having a $CO_2$ content of 4.5% by weight and a distinct CO band in the IR spectrum at 1755 $cm^{-1}$. After brief boiling of the carbonate cellulose with methanol, there were no changes in the intensity or position of the band.

Example 2

100 g of the moist spruce cellulose pretreated as in Example 1 were kept for 6 h at 84° C. with 1 l dimethyl carbonate and 5 g KOH, methanol and dimethyl carbonate being distilled off. Filtration under suction, thorough washing with water and then with isopropanol and drying in vacuo at 50° C. leaves 73 g methyl carbonate cellulose having a $CO_2$ content of 8.2% by weight and showing considerable CO absorption in the IR spectrum at 1756 $cm^{-1}$.

Example 3

The procedure was as in Example 2, except that the reaction time was increased to 10 h. A methyl carbonate cellulose containing 12.9% by weight $CO_2$ was obtained.

Example 4

137 g of a commercially available spruce cellulose are activated as in Example 1 with a solution of sodium hydroxide in water/isopropanol, the sodium hydroxide is displaced by isopropanol and the isopropanol is in turn displaced by cyclohexane.

100 g of the cyclohexane-containing inclusion cellulose were transesterified with 800 g dimethyl carbonate and 0.4 g NaOH for 10 h as in Example 2, filtered under suction, washed with isopropanol and dried. 49 g methyl carbonate cellulose were isolated: $CO_2$ content 15% by weight, strong CO band in the IR spectrum at 1755 $cm^{-1}$.

Example 5

100 g potato starch were stirred for 6 h at 80° C. with 500 ml dimethyl carbonate and 0.5 g KOH. Filtration under suction, washing with isopropanol and drying leaves 90 g methyl carbonate starch showing a pronounced CO absorption in the IR spectrum at 1751 $cm^{-1}$.

Example 6

42 g of a hydroxyethyl cellulose having a DS of approx. 1.1 were stirred for 6 h at 84° C. with 400 ml dimethyl carbonate and 0.4 g KOH. Removal of the dimethyl carbonate, washing with isopropanol, water and, finally, methanol and drying leaves 41 g of a hydroxyethyl methyl carbonate cellulose having a $CO_2$ content of 8.0% by weight and showing a strong CO band in the IR spectrum at 1757 $cm^{-1}$.

Example 7

100 g of a commercially available hydroxyethyl cellulose having a DS of 1.1 were heated for 1 h to 120° C. with 400 g diphenyl carbonate, phenol being distilled off at 1.4 mbar. The residue was taken up in isopropanol and repeatedly washed thoroughly with isopropanol. Drying leaves 105 g with a $CO_2$ content of 11% by weight and a strong CO band in the IR spectrum at 1762 $cm^{-1}$.

Example 8

100 g of a commercially available carboxymethyl cellulose Na salt were stirred for 6 h at 110°–120° C. with 100 g ethylene carbonate and 2.5 g imidazole in 500 ml chlorobenzene. Filtration under suction, washing with isopropanol and drying leaves 106 g of a carboxymethyl cellulose carbonate showing a distinct CO absorption in the IR spectrum besides the carboxylate band.

Example 9

100 g of a spruce cellulose (moist) activated as in Example 1, 200 g ethylene carbonate and 0.5 g KOH were stirred for 4 h at 100°–110° C. in approx. 300 ml chlorobenzene. Filtration under suction, thorough washing with isopropanol and drying leaves a carbonate cellulose showing a pronounced CO absorption in the IR spectrum at 1746 $cm^{-1}$.

Example 10

100 g of a commercially available hydroxyethyl cellulose were stirred for 12 h at 80° C. with 1 l dimethyl carbonate and 5 g KOH, methanol/dimethyl carbonate mixtures being distilled off. Working up by filtration under suction, washing with isopropanol and drying leaves 132 g with a $CO_2$ content of 21.2% by weight.

We claim:
1. A process for the production of a polysaccharide carbonate, where a polysaccharide is transesterified with a carbonic acid ester of the formula

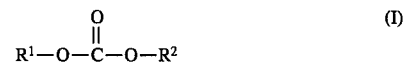

in which $R^1$ and $R^2$ each independently represents $C_{1-12}$ alkyl, allyl, methallyl, benzyl, phenyl or cresyl, or together form a ring of 5 to 12 ring members, in a heterogeneous phase reaction at a temperature of 40° to 160° C. for a time of from 1 to 30 hours.

2. A process according to claim 1, wherein $R^1$ and $R^2$ each independently is $C_{1-4}$ alkyl.

3. A process according to claim 1, wherein the reaction is effected in the presence of a catalyst selected from the group consisting of a compound of an alkali metal, an alkaline earth metal, zinc, cobalt, titanium, zirconium, lead or tin, or a nitrogen base or quaternization product thereof.

* * * * *